United States Patent Office

3,600,279
Patented Aug. 17, 1971

3,600,279
METHOD FOR PRODUCING D-PANTOIC ACID
Takeshi Takahashi, Osaka, and Masao Isono, Hyogo, Japan, assignors to Takeda Chemical Industries, Ltd., Higashi-ku, Osaka, Japan
No Drawing. Continuation-in-part of application Ser. No. 671,570, Sept. 29, 1967. This application June 1, 1970, Ser. No. 42,509
Int. Cl. C12b 1/00
U.S. Cl. 195—2                                     15 Claims

ABSTRACT OF THE DISCLOSURE

D-pantoic acid is produced from DL-pantoic acid by inoculating a culture medium containing the latter with a bacterium which assimilates L-pantoic acid but cannot assimilate D-pantoic acid, incubating the culture until L-pantoic acid is substantially consumed, and recovering the unassimilated D-pantoic acid.

---

This is a continuation-in-part application of Ser. No. 671,570, filed Sept. 29, 1967, now abandoned.

This invention relates to a method for producing D-pantoic acid. More particularly, it relates to a method for producing D-pantoic acid (and/or D-pantolactone) from DL-pantoic acid (and/or DL-pantolactone) which comprises inoculating a bacterium which is capable of assimilating L-pantoic acid (and/or L-pantolactone) but incapable of assimilating D-pantoic acid (and/or D-pantolactone) into a culture medium containing DL-pantoic acid (and/or DL-pantolactone); incubating the said culture until L-pantoic acid (and/or L-pantolactone) in the medium is substantially consumed; and recovering D-pantoic acid (and/or D-pantolactone) therefrom.

Since the acids and the lactones thereof are easily interconvertible, it should be understood that pantoic acid, pantolactone, and their mixture are all equivalent to one another, and so they are simply referred to as "pantoic acid" hereinafter in this specification as well as in the appended claims. Hereinafter D-pantoic acid, L-pantoic acid, DL-pantoic acid are, for simplicity, referred to as D-isomer, L-isomer, and racemate, respectively.

D-pantoic acid is very important as an intermediate in the preparation of D-pantothenic acid.

Hitherto, D-isomer has most advantageously been prepared in practice by reacting DL-pantolactone with quinine sulfate in a solution, recovering only thus-formed D-quinine pantoic therefrom by means of fractional crystallization, and then hydrolyzing it. This method (hereinafter referred to as quinine sulfate method), however, is necessarily accompanied with disadvantages when applied on an industrially large scale, that is:

(1) It requires rather complicated procedures;
(2) The D-isomer preparation obtained by the method is not pure, and is always contaminated with about 5% or so of L-isomer, so that further purification is sometimes required;
(3) Quinine is very expensive, and the cost for production by the method varies with that of the quinine.

Thus, it has been a desideratum in this field to provide a new method of practical value for the production of pure D-isomer on a commercial scale.

The main object of the present invention is therefore to provide a novel and industrially feasible method for producing pure D-isomer preparation.

Another object of the invention is to simplify the process to get high yields and to reduce the cost of production.

These objects are realized by inoculating a bacterium which is capable of assimilating L-isomer but incapable of assimilating D-isomer into a culture medium containing the racemate, incubating the said culture until L-isomer in the medium is substantially consumed, and then recovering D-isomer from the culture medium.

In the quinine sulfate method, the starting racemate is purified before it is treated with quinine sulfate, while in the present invention, crude racemate is employed as a starting material, and there is no need to purify the starting material. Besides, the method does not require such recovering processes of quinine as the quinine-sulfate method does.

Generally, natural forms of racemates are physiologically active, and considered to be utilized by certain microorganisms. But, unexpectedly, the present inventors found that there are three groups of bacteria classified on the basis of their assimilability of pantoic acid:

Group I.—Those which assimilate L-isomer, but not D-isomer;
Group II.—Those which assimilate D-isomer, but not L-isomer;
Group III.—Those which assimilate both D- and L-isomer (hereinafter referred sometimes as L-isomer-assimilating bacteria, D-isomer-assimilating bacteria, and racemate-assimilating bacteria, respectively).

By employing the first group of bacteria, it is possible to isolate D-isomer from the racemate.

All bacteria capable of assimilating L-isomer without assimilating D-isomer are applicable to the present invention. L-isomer-assimilating bacteria are isolated by applying a per se conventional method used in screening objective bacteria from soil, sewage, and the air.

A basal agar plate medium for screening contains, for instance, 0.1% of urea, 0.1% of potassium nitrate, 0.1% of ammonium nitrate, 0.05% of potassium dihydrogenphosphate, 0.05% of dipotassium hydrogenphosphate, 0.05% of magnesium sulfate, 0.01% of yeast extract and agar (about 1.5–2.5%) in water.

As the main carbon source, about 0.5 to 4% by weight of D-isomer or L-isomer is added to the basal medium.

Test bacteria are inoculated onto the two kinds of agar plates (e.g. D-isomer containing-, and L-isomer-containing medium) respectively, and incubated for a few days at 27° C.

L-isomer-assimilating bacteria are selected from those capable of growing on the L-isomer-containing plate medium without growing on D-isomer-containing plate medium.

Care must be taken in determining whether growth occurs or not, since some bacteria which are incapable of assimilating L-isomer happen to grow on the L-isomer-containing plate by assimilating yeast extract and/or a small amount of impurities in agar.

In general, bacteria selected from type cultures in the type culture collection centers have low ability of assimilating L-isomer. Hence, it is more advantageous to select the objective bacteria from soil, sewage, and the air.

For example, 0.1 gram of a soil sample is added to 5 milliliters of DLA medium (cf. Table 1) in a test tube, and the incubation is carried out either stationarily or under agitation for about 1 to 2 weeks. The media for screening are described in Table 1. After proper dilution, the culture is inoculated onto a DLA agar plate, and incubated at 28° C. for about 2 to 7 days. The formed colonies are transferred to A, LA, DA and DLA agar slant medium respectively, and incubated at 28° C. for 7 days.

The results are shown in Table 2.

Further a loopful of the 7 days' culture of the bacteria is added to 5 milliliters of DLA-, LA-, and SA-media (e.g. solution media) in test tubes, respectively, and incubated at 28° C. for 5 days. The amount of the remaining carbon source—i.e. D- and L-pantoic acid—in the media is analyzed according to a per se conventional method.

The results are summarized in Table 3. In Table 2, the marks + and — mean growth and no growth, respectively.

TABLE 1

| Percent | |
|---|---|
| A-medium: | |
| Urea | 0.1 |
| $KNO_3$ | 0.05 |
| $NH_4NO_3$ | 0.05 |
| $KH_2PO_4$ | 0.05 |
| $K_2HPO_4$ | 0.05 |
| $MgSO_4 \cdot 7H_2O$ | 0.05 |
| Yeast extract | 0.01 |
| pH, in tap water | 7.0 |
| LA-agar plate, A plate of LA-medium containing about 2–3% of agar. | |
| DLA-medium, 1% of DL-pantoic acid or DL-pantolactone is added to A-medium, and the pH is adjusted to 7.0. | |
| LA-medium, 0.5% of L-pantoic acid or L-pantolactone is added to A-medium and the pH is adjusted to 7.0. | |
| DA-medium, 0.5% of D-pantoic acid, or D-pantolactone is added to A-medium, and the pH is adjusted to 7.0. | |
| A-, LA- and DA- slant media; Slants of A-, LA-, and DA-media containing about 2–3% of agar, respectively. | |

TABLE 3.—REMAINING CARBON SOURCE IN THE MEDIA (PERCENT)

| | | | Media | | |
|---|---|---|---|---|---|
| Group: | Strain Number | IFO Number | DLA | LA | DA |
| 1 | LP 216-1 | 12402 | 50 | 0 | 100 |
| | LP 166-3 | 12403 | 50 | 0 | 100 |
| | LP 208 | 12404 | 50 | 0 | 100 |
| | LP 75-1 | 12405 | 50 | 0 | 100 |
| | LP 75-2 | 12406 | 50 | 0 | 100 |
| | LP 106-2 | 12407 | 50 | 0 | 100 |
| | LP 46 S | 12408 | 50 | 0 | 100 |
| | LP 60 S | 12409 | 50 | 0 | 100 |
| | LP 166F | 12410 | 50 | 0 | 100 |
| | LP 1-11 | 12411 | 50 | 0 | 100 |
| | LP 50-1Y | 12412 | 65 | 20 | 100 |
| | LP 54 | 12413 | 60 | 0 | 100 |
| | LP 265 S | 12414 | 50 | 0 | 100 |
| | LP 270 S | 12415 | 55 | 0 | 100 |
| | LP 274 | 12416 | 55 | 0 | 100 |
| | LP 207 S | 12417 | 50 | 0 | 100 |
| | LP 135 S | 12418 | 60 | 5 | 100 |
| | LP 26 S-2 | 12419 | 75 | 20 | 100 |
| | LP 14 S | 12420 | 70 | 20 | 100 |
| | LP 49-1 | 12421 | 80 | 35 | 100 |
| 2 | 533 | | 50 | 100 | 0 |
| | 538 | | 50 | 100 | 0 |
| | 539 | | 50 | 100 | 0 |
| | 545 | | 50 | 100 | 0 |
| | 553 | | 50 | 100 | 0 |
| | 603 | | 50 | 100 | 0 |
| | 620 | | 50 | 100 | 0 |
| | 571 | | 50 | 100 | 0 |
| | 628 | | 50 | 100 | 0 |
| | 210 | | 50 | 100 | 5 |
| | 205 | | 55 | 100 | 5 |
| | 362 B | | 55 | 100 | 5 |
| | 343 | | 55 | 100 | 5 |
| | 609 A-7 | | 50 | 100 | 0 |
| | 387 A-1 | | 50 | 100 | 0 |
| | 678 A-3 | | 50 | 100 | 0 |
| | 678 A-5 | | 50 | 100 | 0 |
| 3 | 671 | | 70 | 80 | 75 |
| | 324 | | 55 | 60 | 60 |
| | 468 | | 80 | 90 | 80 |
| | 171 | | 45 | 70 | 60 |

NOTE.—Analytical error ± 10 percent.

Thus-obtained L-isomer-assimilating bacteria are distributed widely over various genera, e.g. Escherichia, Pseudomonas, Xanthomonas, Alkaligenes, Achromobacter, Flavobacterium, Aerobacter, Serratia, Micrococcus, Sarcina, Brevibacterium, Corynebacterium, Arthrobacter, Cellulomonas, Bacillus, Mycobacterium, Sphaerotilus, Micromonospora, Staphylococcus and Chromobacterium. There are found some other bacteria which are taxonomically not identified.

TABLE 2

| | Strain Number | Growth on slants DLA LA DA A | Strain Number | Growth on slants DLA LA DA A |
|---|---|---|---|---|
| Group: | | | | |
| I | LP 216-1 | + + − − | LP 50-1Y | + + − − |
| | LP 166-3 | + + − − | LP 54 | + + − − |
| | LP 208 | + + − − | LP 265 S | + + − − |
| | LP 75-1 | + + − − | LP 270 S | + + − − |
| | LP 75-2 | + + − − | LP 274 | + + − − |
| | LP 106-2 | + + − − | LP 207 S | + + − − |
| | LP 46 S | + + − − | LP 135 S | + + − − |
| | LP 60 S | + + − − | LP 26 S-2 | + + − − |
| | LP 166 F | + + − − | LP 14 S | + + − − |
| | LP 1-11 | + + − − | LP 49-1 | + + − − |
| II | 533 | + − + − | 210 | + − + − |
| | 538 | + − + − | 205 | + − + − |
| | 539 | + − + − | 362 B | + − + − |
| | 545 | + − + − | 343 | + − + − |
| | 553 | + − + − | 610 | + − + − |
| | 603 | + − + − | 609 A-7 | + − + − |
| | 620 | + − + − | 387 A-1 | + − + − |
| | 571 | + − + − | 678 A-3 | + − + − |
| | 628 | + − + − | 678 A-5 | + − + − |
| III | 671 | + + + − | 468 | + + + − |
| | 324 | + + + − | 171 | + + + − |

Above all, the genus Brevibacterium, the genus Corynebacterium, the genus Arthrobacter, and the genus Bacillus include most advantageous bacteria for the object of the present invention, typical strains of which are: *Corynebacterium equi* 1p-1-11 (ATCC-21107), *Corynebacterium humiferum* 1p-106-2 (ATCC-21108), *Arthrobacter tumescens* 1p-75-1 (ATCC-21109), *Arthrobacter ureafaciens* 1p-135-S, (ATCC-21124), *Brevibacterium insectiphilium* 1p-14-S (ATCC-21110), *Brevibacterium maris* (Applicants originally deposited this bacterium under the designation *Brevibacterium malis*, but were subsequently advised by American Type Culture Collection that the proper spelling for the species designation was "maris." Applicants agree with this determination by American Type Culture Collection, and hereinafter, both in the specification and claims, the bacterium will be referred to as *Brevibacterium maris*) 1p-166-3 (ATCC-21111), *Bacillus pulvifaciens* 1p-60-S (ATCC-21112).

Some taxonomical characteristics of these bacteria differ from those described in "Bergey's manual of Determinative Bacteriology, Seventh edition," but their main characteristics are in accordance with the description of the literature. The morphological and physiological characteristics are described in the following Table 4.

For the purpose of the industrial production of D-isomer by L-isomer-assimilating bacteria of this invention, it is advantageous to use a liquid culture medium; generally the incubation is carried out stationarily or by shaking or submerged culture.

TABLE 4

| Strain Number | Coryne bacterium equi 1p-1-11 | Coryne bacterium humiferum 1p-106-2 | Arthrobacter tumescens 1p-75-1 | Arthrobacter ureafaciens 1p-135-S | Brevibacterium insectiphilium 1p-14-S | Brevibacterium maris 1p-166-3 | Bacillus pulvifaciens 1p-60-S |
|---|---|---|---|---|---|---|---|
| Taxonomic characteristics: | | | | | | | |
| Shape of cells | Cocci to rods, 0.5 × 0.5 to 2μ, pleomorphism. | Cocci to rods, 0.5 to 0.7 × 0.7 to 5μ, pleomorphism. | Cocci to rods, 0.4 to 0.6 × 0.7 to 3μ, pleomorphism. | Cocci to rods, 0.6 to 0.8 × 0.8 to 2.5μ, branched. | Short rods, 0.8 to 1.0 × 1.5 to 3μ, pleomorphism. | Cocci to rods, 0.5 to 0.6 × 0.6 to 1.2μ, pleomorphism. | Rods, 0.4 to 0.6 × 3 to 8μ. |
| Motility | None | None | None | None | None | None | Motile. |
| Flagella | do | do | do | do | do | do | Present. |
| Spore formation | do | do | do | do | do | do | Ellipsoidal, 0.7–1.0 × 1.0–1.5μ sporangia swollen. |
| Gram staining | Positive (14 hrs.) variable (4 days). | Positive (14 hrs.) 4 days. | Positive (14 hrs.) 4 days. | Positive (14 hrs.) variable (4 days.) | Positive (14 hrs.) 4 days. | Positive (14 hrs.) variable (4 days.) | Positive (14 hrs.) variable (5 days.) |
| Oxygen requirement | Aerobic | Aerobic | Aerobic | Aerobic | Aerobic | Aerobic | Aerobic. |
| Growth temperature | Good growth at 25 to 37° C., no growth at 48° C. | Good growth at 25° C., no growth at 7° C. or 37° C. | Good growth at 20 to 37° C., no growth at 7° C. or 48° C. | Growth at 7 to 25° C., no growth at 37° C. | Good growth at 7 to 25° C., feeble growth at 37° C., no growth at 48° C. | Growth at 25 to 37° C., no growth at 7° C. or 48° C. | Good growth at 25 or 48° C., no growth at 7° C. |
| Agar slant | Filamentous, moist, opaque, cream-colored, glistening. | Filamentous, moist, opaque, glistening white. | Filamentous, moist, opaque, cream-colored, glistening. | Filamentous, moist, opaque, yellow glistening. | Filamentous, moist, opaque, yellow glistening. | Filamentous, moist, opaque, cream-colored, glistening. | Filamentous, moist, opaque, opalescent, white glistening. |
| Agar plate | Circular, 1 to 1.5 mm. in diameter, entire, raised, white opalescent, moist. | Circular, smaller than 0.5 mm. in diameter auriculate, umbilicate opaque, dry, white. | Circular, with 0.5 to 2 mm. in diameter, entire, raised entire, raised opalescent, white to cream. | Circular with 1.5 mm. in diameter, entire, raised, yellow, moist opaque. | Circular with 0.5 to 1 mm. in diameter entire, raised, yellow, opaque, moist. | Circular with 0.7 to 2.5 mm. in diameter entire, raised, pale yellow moist opaque. | Circular with 0.2 to 1.5 in diameter entire, pale-yellow moist, opalescent. |
| Potato slant | Growth very good cream-colored, moist glistening. | Good growth yellowish brown dry. | Cream-colored moist, glistening. | Heavy growth pale yellow dry. | Heavy growth pale yellow dry. | Feeble growth | Growth pale yellow. |
| Litmus milk | No change | Alkaline | No change | Alkaline | Slightly alkaline curd, peptonization. | No change | No change. |
| Acid production from carbon hydrate. | None | None | None | Acid production from sucrose. | Acid production from sucrose. | None | None. |
| Nitrite production from nitrate. | Positive | None | Positive | None | None | Positive | Do. |
| Gelatin stab | Liquefaction | No liquefaction | No liquefaction | Liquefaction | Liquefaction | No liquefaction | Liquefaction (gradually). |
| Starch hydrolysis | None | None | None | Positive | Positive | None | None. |
| Formation of H₂S | Positive | Positive | Positive | Positive | Positive | Positive | Positive. |
| Indol formation | None | None | None | None | None | None | None. |
| Voges-Proskauer reaction | do | do | do | do | do | do | Do. |
| Catalase production | Positive | Positive | Positive | Positive | Positive | Positive | Positive. |
| Cellulase production | None | None | None | None | None | None | None. |
| D-pantoic assimilation | do | do | do | do | do | do | Do. |
| L-pantoic-assimilation | Positive | Positive | Positive | Positive | Positive | Positive | Positive. |
| Citrate assimilation | | | | | | | |
| 1% glucose agar | | | | | | | Good growth. |
| Soy bean agar | | | | | | | Heavy growth. |

The medium usually contains racemate as a main carbon source.

In addition to L-isomer, there may be added one or more conventional carbon source(s), such as glucose, sucrose, dextrin, starch, glycerin, sorbitol, etc.

As the digestible nitrogen source, there may be exemplified such organic nitrogen sources as urea, peptone, beef extract, casein, edamine, casein hydrolysate, soy bean meal, corn steep liquor, yeast, yeast extract, etc., and such inorganic nitrogen sources as ammonium nitrate, ammonium chloride, ammonium phosphate, ammonium sulfate, sodium nitrate, etc.

Generally an addition of other inorganic salts (e.g.) potassium monohydrogen phosphate, sodium chloride, magnesium sulfate, etc.) and vitamins (e.g., thiamine, nicotinic acid, biotin, paraaminobenzoic acid, pyridoxine) is advantageous for good growth.

The starting racemate may be used in the form of the salt such as sodium salt, potassium salt, calcium salt, ammonium salt, etc. and it is desirably added to the medium in an amount more than 0.5% by weight. The usual concentration in the medium varies, from about 1 to about 30% by weight, according to the culture conditions. The starting racemate is added at one time before the incubation, or at several times intermittently or continuously during the incubation. The starting material is supplied in the form of the free acid or of its salt such as sodium salt, potassium salt, calcium salt, etc., or in the form of its lactone powder; and/or previously dissolved, or emulsified in water.

Incubation conditions such as pH of the medium, and the temperature should be controlled so as to be optimal for the growth of the bacteria. Generally, initial pH of the culture medium and the incubation temperature are advantageous to be adjusted to 5.0 to 10.0, desirably 6.5 to 8.5, and about 15 to about 50° C., desirably 25 to 35° C., respectively.

Aeration is essential for the growth. Proper anti-foam agents may be desirably used.

Incubation is continued until L-isomer in the medium is substantially consumed. The incubation period varies with some factors, for instance, bacteria, temperture, aeration, agitation, composition of the media, etc.

It is also possible to degrade L-isomer in an aqueous solution by bringing it into contact with enzymes which are extracted from cells of the bacteria.

The objective D-isomer remains unchanged in the medium.

Thus, D-isomer can be recovered by simple and conventional procedures, e.g. by means of adsorption chromatography on activated charcoal, alumina, etc., or by means of partition chromatography with water-immiscible solvent such as ethyl ether, benzene, and chloroform, ethyl aceate, etc., by distillation methods, etc., solely or in combination.

Although the present invention has been described in conjunction with preferred embodiments, it is to be understood that modifications and variations may be resorted to without departing from the spirit and scope of the invention, and the following examples are merely for illustrative purposes. In these examples, the yields are calculated on the basis of D-sodium pantoate in the starting materials.

Throughout the specification, the abbreviations "g," "kg.," "° C.," "M.P.," "ml." and "N.M.R." mean gram(s), kilogram(s), degrees centigrade, melting point, milliliter(s), and nuclear magnetic resonance, respectively. Percentages in Table 3 and yields in the examples are expressed as weight/weight; percentages in the other cases are expressed as weight/volume; ATCC numbers attached to the strain numbers of bacteria are accession numbers of the bacteria at American Type Culture Collection, Rockville, Md.

EXAMPLE 1

A 200 ml. Erlenmeyer flask containing 100 ml. of a nutrient solution comprising

|   | Percent |
|---|---|
| Sodium DL-pantoate | 7.9 |
| Urea | 0.2 |
| $KNO_3$ | 0.1 |
| $NH_4NO_3$ | 0.1 |
| $MgSO_4 \cdot 7H_2O$ | 0.05 |
| $KH_2PO_4$ | 0.05 |
| $K_2HPO_4$ | 0.05 |
| Yeast extract | 0.1 | was sterilized by autoclaving and after cooling was inoculated with a suspension of Brevibacterium maris 1p-166-3 (ATCC-21111) which had been obtained by rinsing an agar slant culture with physiological saline solution.

The preliminary culture was shaken for 3 days at 28° C. and then 1 ml. of the culture was transinoculated into 5-two hundred ml. fermentation flasks each containing 100 ml. of the same nutrient solution; these were shaken for 4 days at 28° C.

The contents of each flask were then subjected to filtration and the combined filtrates were adjusted to pH 1, and then repeatedly extracted with ethyl acetate after the remaining D-pantoic acid in the filtrate was lactonized by autoclaving under pressure of 1.2 kg./cm.$^2$ for 10 minutes.

The solvent was distilled off and the resultant residue was purified by further distillation and condensation to give 2.5 g. (yield 83%) of D-pantolactone as white needles.

M.P.: 91 to 92° C.

$[\alpha]_D^{25}$: −50.5° ($H_2O$)

N.M.R.: δ p.p.m. (in $CDCl_2$) 1.08($CH_3$), 1.22($CH_3$), 4.00($CH_2$), 4.07, 4.20(CHOH)

EXAMPLE 2

A 200 ml. Erlenmeyer flask containing 100 ml. of nutrient solution comprising 5.24% of DL-sodium pantoate was sterilized and then inoculated with a suspension of Brevibacterium insectiphilium 1p-14—S (ATCC-21110) obtained by rinsing a slant agar culture with physiological saline solution.

The preliminary culture was shaken for 3 days at 28° C. under shaking, and then 1 ml. of the culture was transinoculated into 5 two hundred ml. fermentation flasks, each containing 100 ml. of the same nutrient solution; these were shaken for 4 days at 28° C., the combined culture filtrate of each flask was adjusted to pH 1, and was repeatedly extracted with ethyl acetate after the remaining D-pantoic acid in the filtrate was lactonized by autoclaving under pressure of 1.2 kg./cm.$^2$ for 10 minutes.

The solvent was distilled off and the resultant residue was purified by further distillation and condensation to give 1.76 g. (yield 88%) of D-pantolactone as white needles whose optical rotation $[\alpha]_D^{25}$ is −50.7° ($H_2O$).

EXAMPLE 3

A 200 ml. Erlenmeyer flask containing 100 ml. of nutrient solution comprising the same nutrient solution as in Example 2, was sterilized and then inoculated with a suspension of Arthrobacter tumescens 1p-75-1 (ATCC-21109) obtained by rinsing a slant agar culture with physiological saline solution.

The preliminary culture was shaken for 3 days at 28° C. under shaking, and then 1 ml. of the culture was transinoculated into 5 two hundred ml. fermentation flasks, each containing the same nutrient solution; these were shaken for 4 days at 28° C.

The contents of each flask were then subjected to filtration and the combined filtrates were adjusted to pH 1, and then repeatedly extracted with ethyl acetate after the remaining D-pantoic acid in the filtrate was lactonized by autoclaving under pressure of 1.2 kg./cm.$^2$ for 10 minutes.

The solvent was distilled off and the resultant residue was purified by further distillation and condensation to give 181 g. (yield 90%) of D-pantolactone as white needles whose optical rotation $[\alpha]_D^{25}$ is −50.4° ($H_2O$).

EXAMPLE 4

A 200 ml. Erlenmeyer flask containing 100 ml. of nutrient solution comprising the same nutrient solution as in Example 2, was sterilized and then inoculated with a suspension of *Arthrobacter ureafaciens* 1p–135–S (ATCC–21124) obtained by rinsing a slant agar culture with physiological saline solution.

The preliminary culture was shaken for 2 days at 28° C. under shaking, and then 1 ml. of the culture was trans-inoculated into 5 two hundred ml. fermentation flasks each containing the same nutrient solution; these were shaken for 4 days at 28° C.

The contents of each flask were then subjected to filtration and the combined filtrates were adjusted to pH 1, and then repeatedly extracted with ethyl acetate after the remaining D-pantoic acid in the filtrate was lactonized by autoclaving under pressure of 1.2 kg./cm.$^2$ for 10 minutes.

The solvent was distilled off and the resultant residue was purified by further distillation and condensation to give 1.64 g. (yield 82%) of D-pantolactone as white needles, whose optical rotation $[\alpha]_D^{25}$ is −50.6° ($H_2O$).

EXAMPLE 5

A 200 ml. Erlenmeyer flask containing 100 ml. of nutrient solution comprising the same nutrient solution as in Example 2 was sterilized and then inoculated with a suspension of *Corynebacterium equi* 1p–1–11 (ATCC–21107) obtained by rinsing a slant agar culture with physiological saline solution.

The preliminary culture was shaken for 2 days at 28° C. under shaking, and then 1 ml. of the culture was trans-inoculated into 5 two hundred ml. fermentation flasks each containing the same nutrient solution; these were shaken for 4 days at 28° C.

The contents of each flask were then subjected to filtration and the combined filtrates were adjusted to pH 1, and then repeatedly extracted with ethyl acetate after the remaining D-pantoic acid in the filtrate was lactonized by autoclaving under pressure of 1.2 kg./cm.$^2$ for 10 minutes.

The solvent was distilled off and the resultant residue was purified by further distillation and condensation to give 1.71 g. (yield 85%) of D-pantolactone as white needles, whose optical rotation $[\alpha]_D^{25}$ is −50.6° ($H_2O$).

EXAMPLE 6

A 200 ml. Erlenmeyer flask containing 100 ml. of nutrient solution comprising the same nutrient solution as in Example 2 was sterilized and then inoculated with a suspension of *Corynebacterium humiferum* 1p–106–2 (ATCC–21108) obtained by rinsing a slant agar culture with physiological saline solution.

The preliminary culture was shaken for 2 days at 28° C. under shaking, and then 1 ml. of the culture was trans-inoculated into 5 two hundred ml. fermentation flasks each containing the same nutrient solution; these were shaken for 4 days at 28° C.

The contents of each flask were then subjected to filtration and the combined filtrates were adjusted to pH 1, and were then repeatedly extracted with ethyl acetate after the remaining D-pantoic acid in the filtrate was lactonized by autoclaving under pressure of 1.2 kg./cm.$^2$ for 10 minutes.

The solvent was distilled off and the resultant residue was purified by further distillation and condensation to give 1.69 g. (yield 84%) of D-pantolactone as white needles, whose optical rotation $[\alpha]_D^{25}$ is −50.7° ($H_2O$).

EXAMPLE 7

A 200 ml. Erlenmeyer flask containing 100 ml. of nutrient solution comprising 2.62% of DL-sodium pantoate was sterilized and then inoculated with a suspension of *Bacillus pulvifaciens* 1p–60–S (ATCC–21112) obtained by rinsing a slant agar culture with physiological saline solution.

The preliminary culture was shaken for 2 days at 28° C. under shaking, and then 1 ml. of the culture was trans-inoculated into 5 two hundred ml. fermentation flasks each containing the same nutrient solution; these were shaken for 4 days at 28° C.

The contents of each flask were then subjected to filtration and the combined filtrates were adjusted to pH 1 and then repeatedly extracted with ethyl acetate after the remaining D-pantoic acid in the filtrate was lactonized by autoclaving under pressure of 1.2 kg./cm.$^2$ for 10 minutes.

The solvent was distilled off and the resultant residue was purified by further distillation and condensation to give 0.87 g. (yield 85%) of D-pantolactone as white needles, whose optical rotation $[\alpha]_D^{25}$ is −50.4° ($H_2O$).

EXAMPLE 8

A 200 ml. Erlenmeyer flask containing 100 ml. of nutrient solution comprising the same nutrient solution as in Example 1 was sterilized and then inoculated with a suspension of *Brevibacterium maris* 1p–166–3 (ATCC–21111) obtained by rinsing a slant agar culture with physiological saline solution.

The preliminary culture was shaken for 2 days at 28° C. under shaking and then the whole culture was trans-inoculated into a 2 liter conventional fermentor equipped with an agitation device, an aeration device, a temperature controlling device, pH-analyzer, etc. and charged with 1 liter of the same nutrient solution; these were incubated under aeration and agitation at 28° C.

53 g. of sodium DL-pantoate was added to the medium after 32 hours cultivation when L-pantoic acid in the starting medium was substantially consumed, and the incubation was further carried out for about 30 hours.

The culture filtrate was adjusted to pH 1, and was repeatedly extracted with ethyl acetate after the remaining D-pantoic acid in the filtrate was lactonized by autoclaving under pressure of 1.2 kg./cm.$^2$ for 10 minutes.

The solvent was distilled off and the resultant residue was purified by further distillation and condensation to give 86 g. of D-pantolactone (yield 86%) as white needles, whose optical rotation $[\alpha]_D^{25}$ is −50.6° ($H_2O$).

What is claimed is:

1. A method for producing D-pantoic acid from DL-pantoic acid which comprises inoculating a bacterium which is capable of assimilating L-pantoic acid, but is incapable of assimilating D-pantoic acid, into a culture medium containing at least one of DL-pantoic acid and a salt thereof, incubating the said culture until at least one of L-pantoic acid and a salt thereof in the medium is substantially consumed, and recovering D-pantoic acid therefrom.

2. A method according to claim 1, wherein the bacterium belongs to the genus Brevibacterium.

3. A method according to claim 2, wherein the bacterium is *Brevibacterium insectiphilium* ATCC–21110.

4. A method according to claim 2, wherein the bacterium is *Brevibacterium maris* ATCC–21111.

5. A method according to claim 1, wherein the bacterium belongs to the genus corynebacterium.

6. A method according to claim 5, wherein the bacterium is *Corynebacterium equi* ATCC–21107.

7. A method according to claim 5, wherein the bacterium is *Corynebacterium humiferum* ATCC–21108.

8. A method according to claim 1, wherein the bacterium belongs to the genus Arthrobacter.

9. A method according to claim 8, wherein the bacterium is *Arthrobacter tumescens* ATCC–21109.

10. A method according to claim 8, wherein the bacterium is *Arthrobacter ureafaciens* ATCC-21124.

11. A method according to claim 1, wherein the bacterium belongs to the genus Bacillus.

12. A method according to claim 11, wherein the bacterium is *Bacillus pulvifaciens* ATCC-21112.

13. A method according to claim 1, wherein the culture medium containing the sufficiently grown bacterium is adjusted to a pH of from about 5.0 to about 10.0 and kept at a temperature of from about 15° C. to about 50° C.

14. A method according to claim 1, wherein the starting DL-pantoic acid is in the form of lactone.

15. A method according to claim 1, wherein the starting DL-pantoic acid is in the form of salt.

References Cited

UNITED STATES PATENTS 3,290,225  12/1966  Rauenbusch et al. _____ 195—2

A. LOUIS MONACELL, Primary Examiner

G. M. NATH, Assistant Examiner

U.S. Cl. X.R.

195—30